Patented Nov. 8, 1927.

1,648,569

UNITED STATES PATENT OFFICE.

HANS TRAPP, OF ORANIENBURG-BERLIN, GERMANY.

PROCESS FOR THE MANUFACTURE OF PURE ZIRCONIUM SULPHATE.

No Drawing. Application filed October 2, 1924, Serial No. 741,288, and in Germany September 25, 1923.

The manufacture of pure zirconium, especially the separation of the zirconium from the larger or smaller quantities of iron and titanium, always present, is accompanied by serious difficulties if it is desired to obtain larger quantities of purest zirconium.

The present invention discloses a process which will admit of the manufacture of any desired quantity of a pure oxide of zirconium in a technically simple manner.

Zirconium in ores as a rule is accompanied by iron and titanium, and it is very difficult to separate it from the latter substances. It is for instance not possible to separate the sulphate of zirconium by simple crystallization from a solution of a decomposition of zirconium with sulphuric acid to a technically satisfactory extent. It has been found, that it is possible to obtain pure oxide of zirconium by starting from impure oxide of zirconium if the reaction mass of sulphuric acid and zirconium ore is dissolved in a highly concentrated form and then further treated in a suitable manner. The concentrated solution of sulphate of zirconium will dissolve only a limited quantity of sulphate of iron which remains in solution. If the sulphate of zirconium is precipitated from the solution, either by the addition of sulphuric acid or by hydrolysis up to about 70° and more (whereby a basic sulphate of zirconium is precipitated) a mother-liquor will result, containing large quantities of free sulphuric acid, in which the iron and titanium originally contained in solution will remain in solution almost completely. The process may be also carried on in such a manner that the above mentioned basic sulphate is converted into a second yet more basic one ($ZrO_2 : SO_3$ = about $1:0.75$).

Part of the sulphuric acid can be substituted by other strong mineral acids, for instance by hydrochloric acid.

On repetition of this step by means of sulphuric or hydrochloric acid respectively, it is possible to obtain an extensive purification even if the substance treated contained a high percentage of iron and titanium.

For the purpose of obtaining a perfectly pure preparation, one is at liberty to repeat either of the processes mentioned above, or both combined processes can be carried through simultaneously. For instance it is suitable in certain cases to first employ the process of precipitation and follow it with the method of hydrolysis, if it is desired to obtain perfectly pure preparations.

In many instances it will prove sufficient to dispense with a filtration after the first precipitation. Merely use of a decanter is made and then digesting is carried on with a sulphuric-acid liquor until basic sulphate is obtained. Purification by means of hydrolysis can also be carried out in such a way that solid sulphate of zirconium is suspended in the mother-liquor, while the whole is digested together with the mother-liquor until a basic sulphate is obtained. In this instance a basic sulphate of zirconium is also obtained, if the sulphate formed first is again digested. The various pure sulphates of zirconium thus obtained are used for the manufacture of pure zirconium oxide and zirconium salts, by drying and calcining the precipitate to volatilize off the sulfur and convert the hydrated oxide $ZrO_2.H_2O$ into the oxide $ZrO_2$.

*Examples.*

I. The material obtained by the decomposition with sulphuric acid of minerals containing zirconium, is dissolved in diluted sulphuric acid, so that a solution is obtained, containing about 13 per cent of $ZrO_2$ and about 10 per cent of free sulphuric acid. If now a concentrated solution of $H_2SO_4$ is added, 1 gramme of the latter will precipitate about 1 gramme of sulphate of zirconium ($Zr(SO_4)_2.4H_2O$).

II. If the solution obtained according to Example I is hydrolyzed at 70° and above, a basic sulphate of about the composition $ZrO_2 : SO_3 = 1:1.4$ is precipitated. This procedure, of course, increases the concentration of the sulphuric acid in the solution because sulphuric acid is liberated as the hydrolysis proceeds. Such increase in the acid concentration aids in the precipitation of the basic sulphate. If digestion of the basic sulphate thus obtained is continued, a basic salt still poorer in sulphuric acid is obtained, composed about as follows: $ZrO_2 : SO_3$ as about $1:0.75$.

In both instances the mother-liquors retain almost all the iron and titanium in solution, which will keep in solution only a few per cent of $ZrO_2$ besides 40 per cent free sulphuric acid, if the operation is carried through properly.

Having now particularly described and ascertained the nature of my said invention and in what manner the same is to be performed I declare that what I claim is:—

1. In the process of obtaining pure zirconium oxide from its ores, the step which comprises dissolving an impure zirconium sulphate in dilute sulphuric acid of such concentration that the resulting solution contains about 10% of free sulphuric acid, and thereafter precipitating a pure zirconium sulphate from said solution by increasing the acid concentration of said solution.

2. In the process of obtaining pure zirconium oxide from its ores, the step which comprises dissolving an impure zirconium sulphate in dilute sulphuric acid of such concentration that the resulting solution contains about 10% of free sulphuric acid, and thereafter precipitating a pure zirconium sulphate from said solution by heating said solution.

3. In the process of obtaining pure zirconium oxide from its ores, the step which comprises dissolving an impure zirconium sulphate in dilute sulphuric acid of such concentration that the resulting solution contains about 10% of free sulphuric acid, and thereafter precipitating a pure zirconium sulphate from said solution by heating said solution at a temperature of 70° C.

In testimony whereof I affix my signature.

HANS TRAPP.